(12) United States Patent
Glenn et al.

(10) Patent No.: US 6,639,438 B2
(45) Date of Patent: Oct. 28, 2003

(54) APPARATUS AND METHOD FOR COMMUNICATION LINK HAVING PARALLEL SIGNAL DETECT WITH HYSTERESIS

(75) Inventors: Robert C. Glenn, Bend, OR (US); Sumant Ranganathan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 09/895,998

(22) Filed: Jun. 30, 2001

(65) Prior Publication Data

US 2003/0001643 A1 Jan. 2, 2003

(51) Int. Cl.$^7$ .................................................. H03L 7/00
(52) U.S. Cl. ........................................ 327/154; 327/205

(58) Field of Search ................................. 327/154, 205, 327/206; 375/354, 355

(56) References Cited

U.S. PATENT DOCUMENTS 6,300,816 B1 * 10/2001 Nguyen ...................... 327/407

* cited by examiner

Primary Examiner—Kenneth B. Wells
(74) Attorney, Agent, or Firm—Blakely, Sokoloff, Taylor & Zafman LLP (57) ABSTRACT

A method is described that involves directing a signal through a hysteresis comparator. Then, determining if an output signal of the hysteresis comparator, in response to the signal, is an AC signal or a DC signal. Then, deactivating a signal reception unit that receives the signal if the hysteresis comparator output signal corresponds to a DC signal; or, activating the signal reception unit if the hysteresis comparator output signal corresponds to an AC signal.

25 Claims, 5 Drawing Sheets

APPARATUS AND METHOD FOR COMMUNICATION LINK HAVING PARALLEL SIGNAL DETECT WITH HYSTERESIS

FIELD OF THE INVENTION

The field of invention relates to data signal processing generally; and more specifically, to compensating for the skew that exists between a clock signal and a data signal.

BACKGROUND

Figure 1:
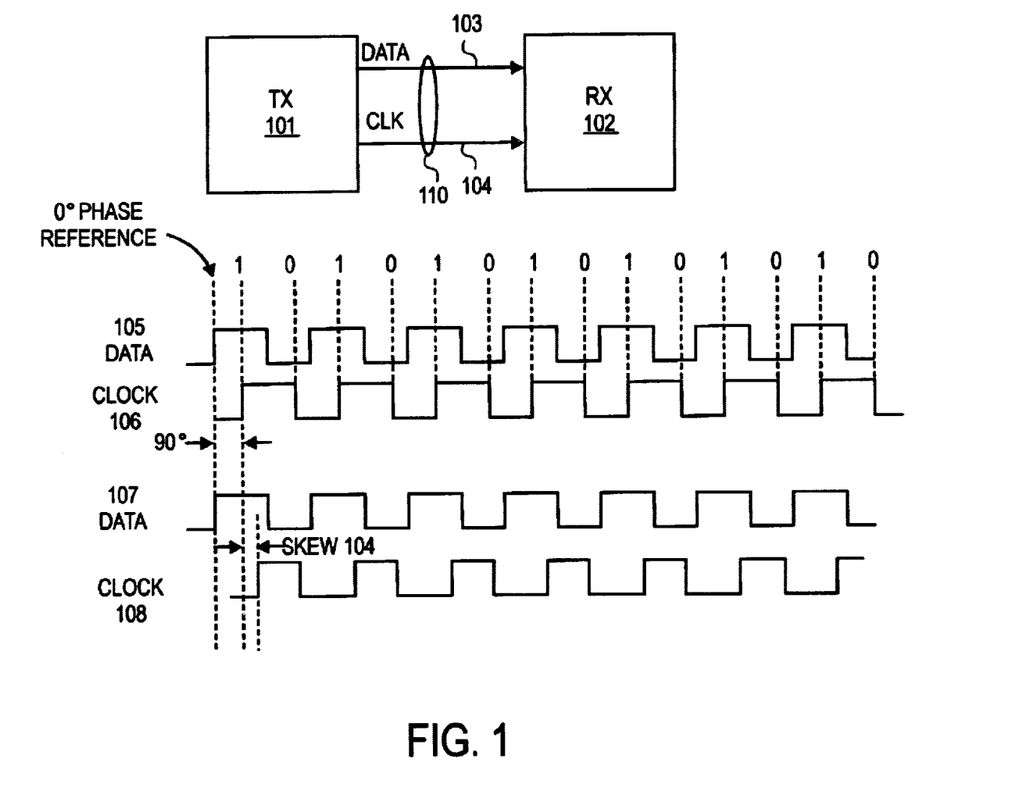
FIG. 1 shows a serial data link.

FIG. 1 shows a pair of semiconductor chips 101, 102 coupled together by a serial link 110 having a data signal line 103 and a clock signal line 104. The transmitting unit 101 sends a data signal 105 to the receiving unit 102 along data signal line 103. The receiving unit 102 uses a clock signal 106 that is sent along clock signal line 104 to receive the data 105.

That is, in the example of FIG. 1, the receiving unit 102 clocks the data signal 105 on the rising edge of the clock signal 106. The clock signal 106 may be referred to as a quadrature clock because the phase of its rising edges are 90 degrees away from the rising edges of the data signal 105 (using the data signal 105 as a phase reference). A link that transmits a clock along with data may be referred to as a source synchronous interface. Various source synchronous interfaces exist such as, for example, Low Voltage Differential Signalling (LVDS) or Serial Gigabit Media Independent Interface (SGMII).

A problem with serial links, particularly as their frequency of operation rises, is the presence of skew 109 between a data signal 107 and a clock signal 108 when it is received at the receiving unit. Skew 109 is any phase relationship between the edges of the data signal 107 and clock signal 108 other than the nominal or "designed for" phase relationship (such as 90 degrees, using the data signal 105 as a phase reference).

Skew may arise because the transfer function and/or trace length of the data signal line 103 is different than the transfer function and/or trace length of the clock signal line 104. For example if the data signal line 103 is shorter or has less capacitance than the clock signal line 103, the rising edges of the clock signal 108 can have more than 90 degrees of phase shift with respect to the rising edges of the data signal 107.

For a given difference in transfer function and/or trace length between the data and clock signal lines 103, 104, greater skew is observed between the data signal 107 and clock signal 108 as the frequency of operation of the serial link 110 increases. That is, the differences between the signal lines 103, 104 have an effect on the delay of the signals as they propagate from the transmitting unit 101 to the receiving unit 102. As the frequency of the serial link's operation rises, the delay represents a greater percentage of the data signal's pulse widths.

As skew 109 increases the performance of the serial link degrades. That is, because the receiving unit 102 uses the clock signal to clock the reception of the data carried by the data signal 107, the "misposition" of the clock signal 108 edges causes the receiving unit 102 to consistently clock incorrect data.

BRIEF DESCRIPTION OF THE DRAWINGS

The present invention is illustrated by way of example and not limitation in the figures of the accompanying drawings.

FIG. 2b shows a hysteresis curve for the hysteresis comparator of FIG. 2a;

FIG. 2c shows input and output signal waveforms for the hysteresis comparator of FIG. 2a;

DETAILED DESCRIPTION

Figure 2A:
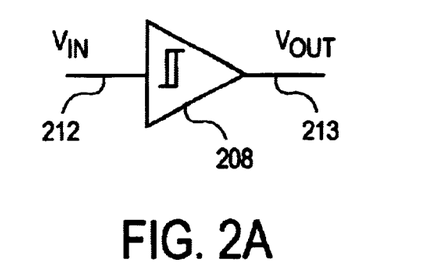
FIG. 2a shows a hysteresis comparator.

FIG. 2a shows a comparator 208 having hysteresis (which may also be referred to as a hysteresis comparator 208). The functional operation of a hysteresis comparator may be described with reference to a hysteresis curve (such as the hysteresis curve 200 of FIG. 2b) and exemplary input and output signal waveforms (such as the exemplary input and output signal waveforms 203, 215 observed in FIG. 2c).

According to the operation of a hysteresis comparator, an input signal $V_{IN}$ 203 is compared against a pair of thresholds $V_{TH}$+a and $V_{TH}$-a. If the input signal $V_{IN}$ 203 reaches an amplitude 210 that exceeds $V_{TH}$+a (when the output $V_{OUT}$ 215 is at a first voltage $V_1$), the output signal $V_{OUT}$ 215 "flips" to a second voltage $V_2$ (as observed at time T1 in FIG. 2c). After the comparator output $V_{OUT}$ 215 reaches a voltage of $V_2$, if the input signal $V_{IN}$ 203 subsequently falls to an amplitude beneath $V_{TH}$-a, the output $V_{OUT}$ 215 "flips" back to the first voltage $V_1$ (as observed at time T2 in FIG. 2c).

The sequence may then repeat. That is, if the input signal $V_{IN}$ 203 returns to reach an amplitude that exceeds $V_{TH}$+a, the output signal "flips" back to the second voltage $V_2$ (as observed at time T3 in FIG. 2c). The hysteresis of a hysteresis comparator 208 may be used as "signal detect" for the input signal. For example, if the input signal $V_{IN}$ 203 amplitude does not rise above $V_{TH}$+a (when the comparator 208 output is at $V_1$), no "flip" in output signal occurs and the output signal $V_{OUT}$ 215 remains at $V_1$.

Thus, for those input signals that do not have sufficient amplitude to both exceed $V_{TH}$+a and fall beneath $V_{TH}$-a, a DC (i.e., time constant) voltage appears at the hysteresis comparator 208 output. For those input signals that do have sufficient amplitude to both exceed $V_{TH}$+a and fall beneath $V_{TH}$-a, an AC (i.e., time varying) waveform appears at the hysteresis comparator 208 output that corresponds to a "re-formatted" interpretation of the input signal $V_{IN}$ 203 (as observed in FIG. 2c).

As such, a DC hysteresis comparator output signal may be viewed as the non-existence of an input signal (for lack of sufficient strength due to insignificant amplitude) while an AC hysteresis comparator output signal may be viewed as the existence of an input signal (having sufficient strength due to an amplitude that exceeds $V_{TH}$+a and falls beneath $V_{TH}$-a).

Referring to FIG. 1, in prior art solutions, it is common practice to include an "in-line" (i.e., "in series") hysteresis comparator within the receiver 102 that directly intercepts and replaces the data or clock signals. That is, referring to FIGS. 1 and 2a through 2c, the hysteresis comparator input 212 of FIG. 2a may be coupled to a data signal line 103 (and/or a clock signal line 104) so that the hysteresis comparator output 213 can be used by the receiver 102 as a direct interpretation of the data signal 105 (or clock signal 106). That is, in effect, the hysteresis comparator output signal $V_{OUT}$ 215 "replaces" (within the receiver 102) the data signal 105 (or clock signal 106) received on the data signal line 103 (or clock signal line 104).

A problem with "in-line" hysteresis comparators, however, is that distortions in the shape or positioning of the comparator's hysteresis curve 200 can cause distortions in the comparator output signal waveform. As the comparator 208 output signal waveform in an "in line" approach replaces the signal actually being received, the distortions result in a form of skew (as described above in the background), or other signal quality problem, that can result in the consistent misinterpretation of data.

Figure 3:
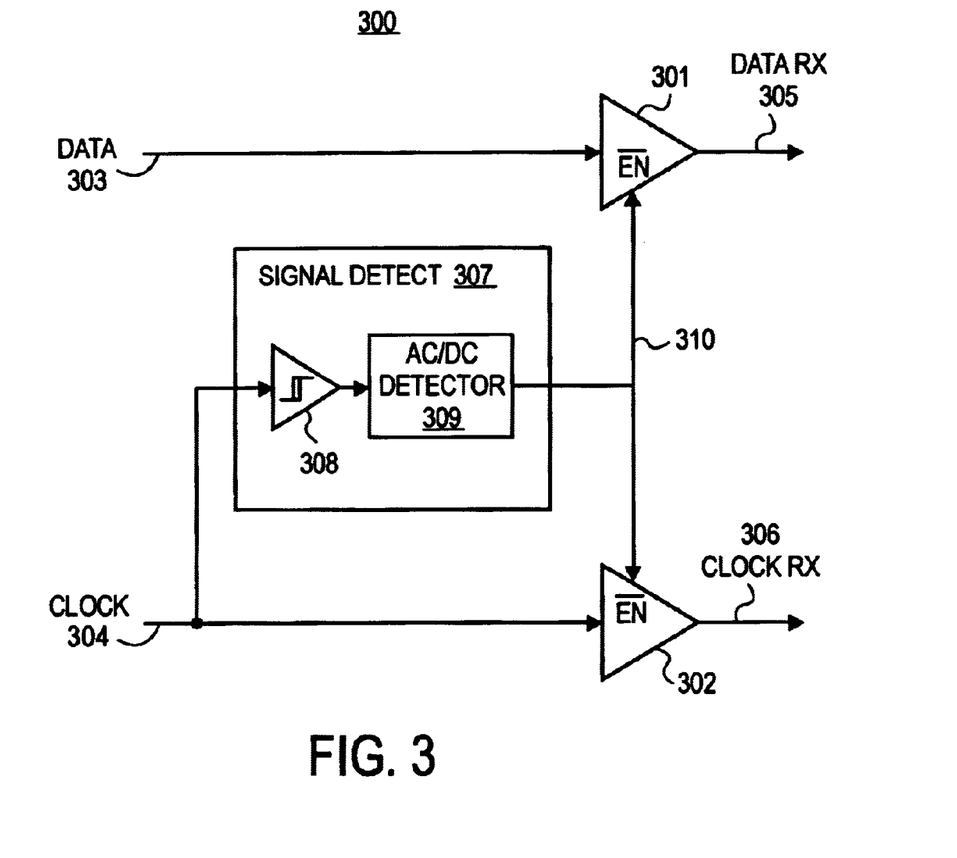
FIG. 3 shows a serial link receiving front end having a parallel signal detect with hysteresis.

Thus, in order to enjoy the signal integrity that a hysteresis comparator can provide, a non "in-line" approach (i.e., a "parallel" approach) may be applied. FIG. 3 shows a serial link receiving front end 300 having a parallel signal detect with hysteresis. Note that the signal detect circuit 307 (which includes a hysteresis comparator 308) is parallel to the clock signal line 304 rather than in series with it (as is the case with an "in line" approach).

As such comparators 301, 302 that do not have hysteresis (or other reception circuits such as a receiving buffers, etc.) may be placed "in line" with the data and clock signal lines 303, 304. That is, within a receiving device, the data signal received on data signal line 303 (which may be viewed as corresponding to data signal line 103 of FIG. 1) is replaced by the signal at the output (Data RX 305) of "non hysteresis" comparator 301; and, the clock signal received on clock signal line 304 is replaced by the signal at the output (Clock RX 306) of "non hysteresis" comparator 302.

Because the in line comparators 301, 302 do not have hysteresis, skew problems or other signal integrity problems that arise from a non ideal hysteresis curve are removed from the signal paths. As a result, the accuracy of a receiver that utilizes the approach of FIG. 3 is improved (with respect to approaches that employ in line hysteresis) because hysteresis induced signal quality problems are avoided. Nevertheless, because a hysteresis comparator 308 is employed within a parallel signal detect circuit 307, the receiving front end 300 may easily detect valid signals as described in more detail below.

Note that in the embodiment of FIG. 3, each of the non hysteresis comparators 301, 302 has an enable input 310. The enable input 310 controls whether or not the non hysteresis comparators 301, 302 will have an active output or an inactive output. Live signals that correspond to interpretations of the signaling on the data and clock signal lines 303, 304 will appear on the outputs 305, 306 of the non hysteresis comparators if the outputs 305, 306 are active.

No live signals will appear on the outputs 305, 306 (e.g., a DC voltage and/or a high impedance state) if the outputs 305, 306 are inactive. In a sense, the non hysteresis comparators 301, 302 ignore the signaling on the data and clock signal lines 303, 304 which results in a lack of signaling transitions at the non hysteresis comparator outputs 305, 306.

Figure 2B:
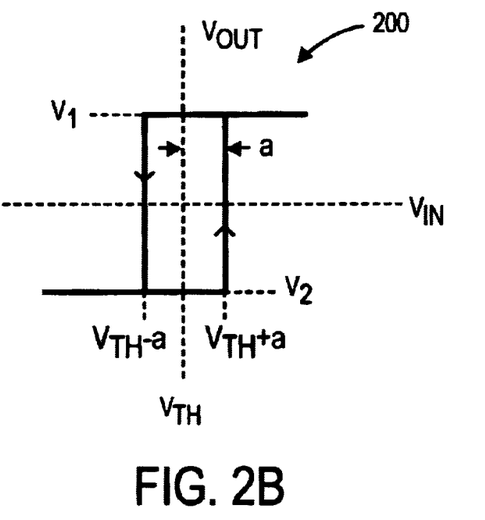
Figure 2C:
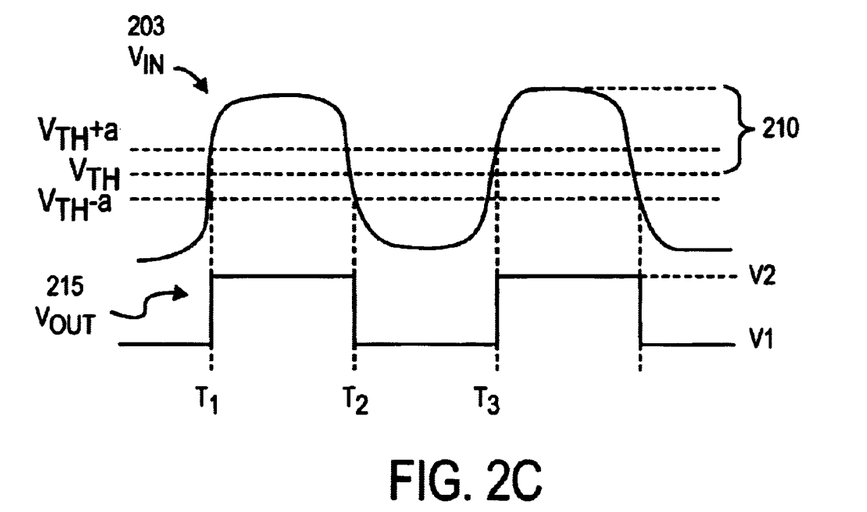

In the embodiment of FIG. 3, the signal detect circuit 307 employs a hysteresis comparator 308 and an AC/DC detector 309 to control the enable inputs 310 of the non hysteresis comparators 301. As seen in FIG. 3, the hysteresis comparator 308 is coupled in parallel with the clock signal line 304. The hysteresis comparator 308, as discussed with respect to FIGS. 2a through 2c, provides either an AC signal at its output (if a "valid" signal appears along the clock signal line 304) or a DC signal at its output (if an "invalid" signal appears along the clock signal line 304).

The AC/DC detector circuit 309 enables the non hysteresis comparator outputs 305, 306 (so that they are active) if an AC signal is detected at the hysteresis comparator 308 output. The AC/DC detector circuit 309 disables the non hysteresis comparator outputs 305, 306 (so that they are inactive) if a DC signal is detected at the hysteresis comparator 308 output. As such, signal transitions at the non hysteresis comparator outputs 305, 306 are effectively "gated" by the type of signal (AC or DC) that appears at the hysteresis comparator 308 output.

That is, the receiver 300 propagates input signals received with sufficient strength (to trigger transitions at the hysteresis comparator output) and ignores input signals received with insufficient strength (to trigger transitions at the hysteresis comparator output). Input signals having sufficient strength may be referred to as "valid" signals and input signals having insufficient strength maybe referred to as "invalid".

In an alternate embodiment, the hysteresis comparator 308 is coupled in parallel to the data signal line 303 (rather than the clock signal line 304) so that the signal detect circuit 307 effectively "checks" the signal strength of the data signal rather than the clock signal. In another alternate embodiment, both the data signal line 303 and the clock signal line 304 may be "checked" for a signal by a hysteresis comparator.

For example, a second hysteresis comparator may be added to the embodiment 300 of FIG. 3 that is coupled in parallel to the data signal line 303 so that the signal strength of the data signal can also be detected. The signal detect circuit 307 may then be designed to: 1) activate the non hysteresis comparator outputs 305, 306 if both hysteresis comparator outputs provide an AC signal; and, 2) inactivate the non hysteresis comparator outputs 305, 306 if either of the hysteresis comparator outputs provide a DC signal.

Figure 4:
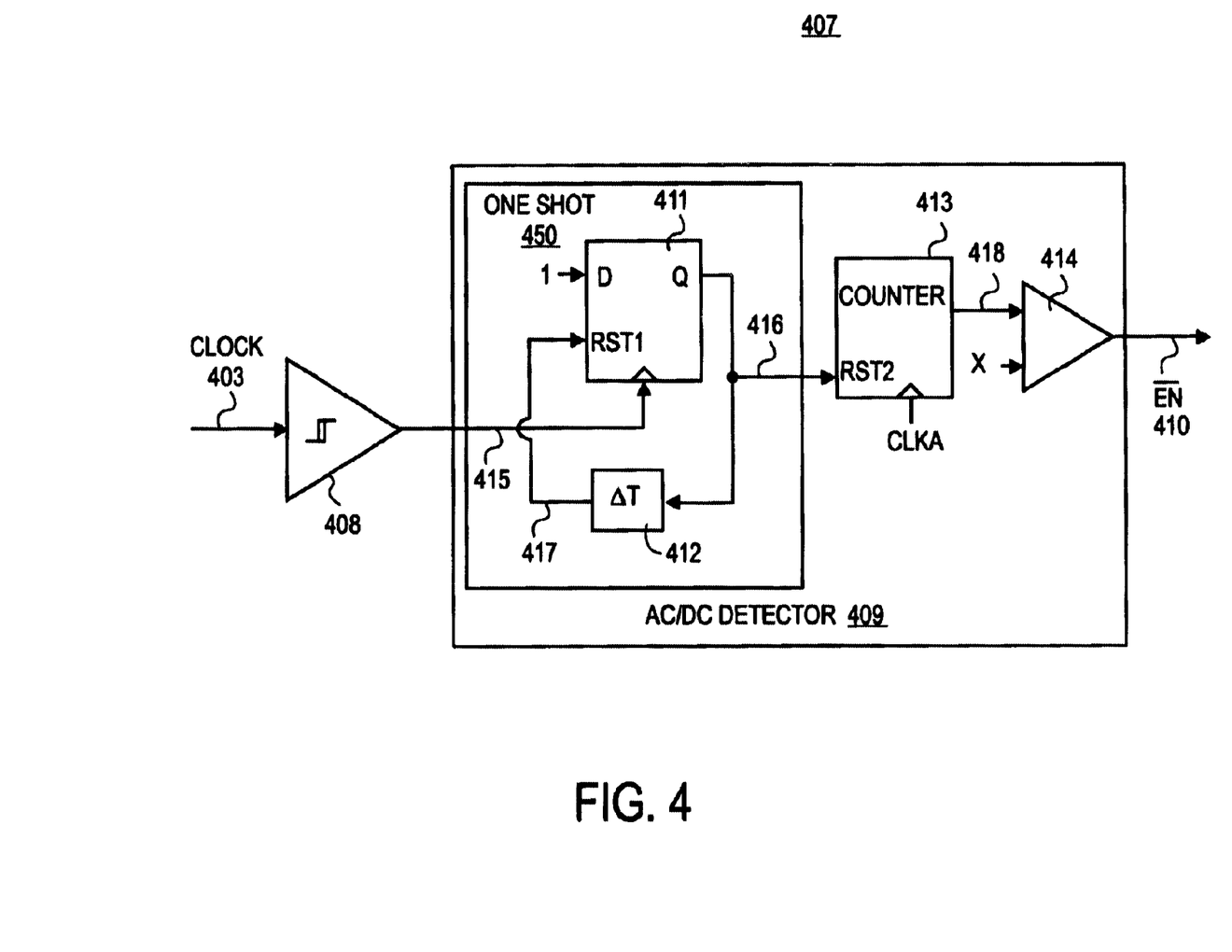
FIG. 4 shows an embodiment of the signal detect circuit of FIG. 3.
Figure 5:
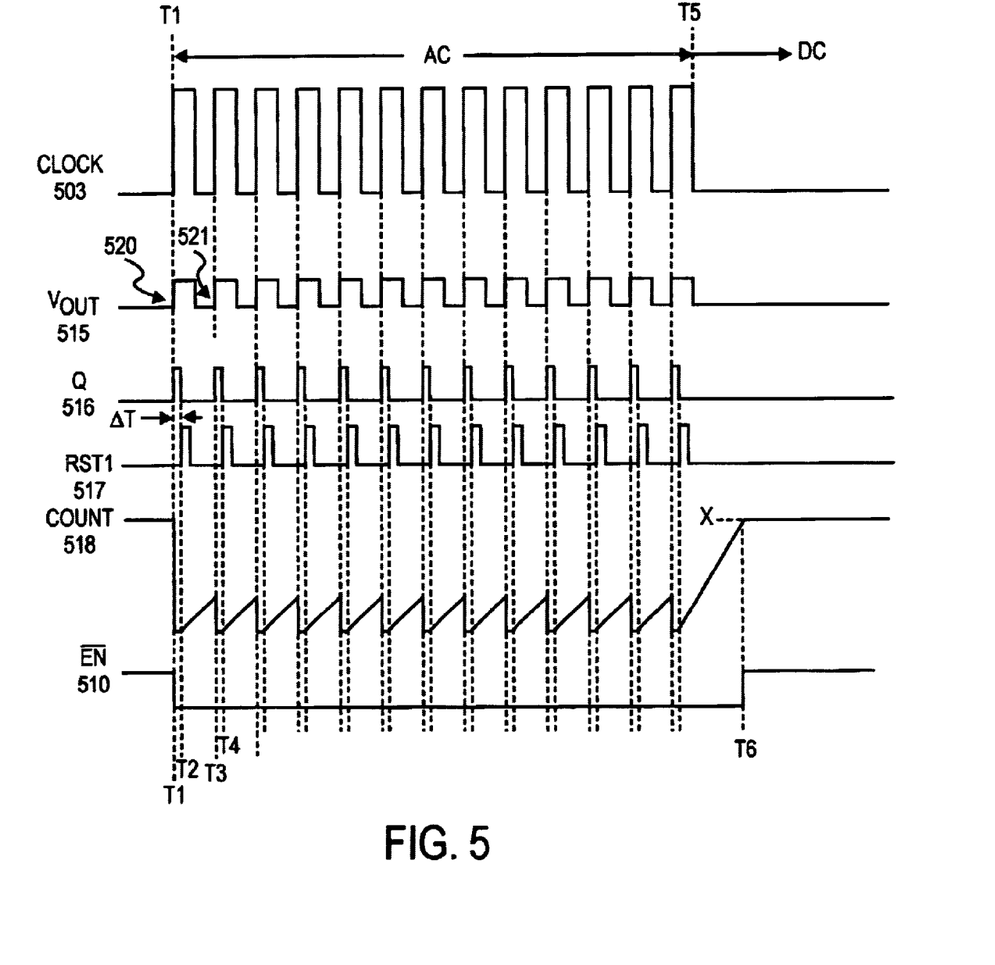
FIG. 5 shows exemplary waveforms of the signal detect circuit embodiment of FIG. 4.

FIG. 4 shows an embodiment of a design that may be used to implement the AC/DC detector 409 of FIG. 4. FIG. 5 shows waveforms that correspond to various nodes within the AC/DC detector embodiment 409 of FIG. 4 and will be used to explain its operation. Referring to FIGS. 3, 4 and 5, note that the clock signal line 403 of FIG. 4 may be viewed as corresponding to the clock signal line 303 of FIG. 3. As such, clock waveform 503 of FIG. 5 corresponds to an exemplary waveform that may appear on signal lines 303, 403.

Furthermore, hysteresis comparator 408 of FIG. 4 may be viewed as corresponding to hysteresis comparator 308 of FIG. 3. The $V_{OUT}$ waveform 515 of FIG. 5 may therefore be viewed as corresponding to a signal that appears on the hysteresis comparator output node 415 (i.e., the hysteresis comparator 408 output waveform) in response to the clock waveform 503. Note that the $V_{OUT}$ waveform 515 of FIG. 5 is an AC waveform between times T1 and T5 (which is synonomous with the existence of a signal on the clock signal line 403); and that, the $V_{OUT}$ waveform 515 is a DC signal after time T5 (which is synonomous with the absence of a signal on the clock signal line 403).

In the embodiment of FIG. 4, the hysteresis comparator output 415 is coupled to the clock input of D flip flop 411. The D input of the flip flop 411 is coupled to a logic value of "1". As such, for each rising edge of the hysteresis comparator output waveform 515 (or falling edge, depending on the design of the flip flop 411), a "1" is registered at the output node 416 of the flip flop. As such, a design point perspective of the AC/DC detector 409 embodiment of FIG. 4 corresponds to the presence of a flip flop clocking signal if a signal appears on clock line 403. If no signal appears on clock line 403, the flip flop clocking signal disappears. The hysteresis comparator output waveform 515 observed in FIG. 5 corresponds to this description.

According to the operation observed in FIGS. 4 and 5, the D flip flop 411 of FIG. 4 is "clocked" by the hysteresis comparator 408 when a signal appears in the clock waveform 503. The flip flop 411 has its output node 416 coupled to its reset input 417 in a feedback arrangement through a delay unit 412. As described in more detail, this arrangement corresponds to a "one shot" circuit 450 that emits an output pulse for every rising edge provided by the hysteresis comparator 408. The output pulses "disappear" if a DC signal is provided by the hysteresis comparator 408 (because the hysteresis comparator 408 will have stopped providing rising edges).

Thus, in a sense, if a first AC signal is provided by the hysteresis comparator 408 a second AC signal is provided by the one shot circuit 450; and, if a first DC signal is provided by the hysteresis comparator 408, a second DC signal is provided by the one shot circuit 450. According to the design theory of the AC/DC detector embodiment 409 of FIG. 4, if an AC signal is provided by the hysteresis comparator 408, the one shot circuit 450 output waveform 516 has a different pulse width than the hysteresis comparator 408 output waveform 515.

The one shot circuit output 416 is coupled to a reset input of a counter 413. Because the one shot circuit 450 output waveform 516 provides a pulse stream during the presence of an AC signal at the hysteresis comparator output 415, the state of the counter 413 changes back and forth between a region of time when it "counts up" and a region of time when it is reset. As a result, if an AC signal is provided by the hysteresis comparator 408, the counter 413 is unable to reach a substantial count value because it is constantly being reset.

Waveform 518 of FIG. 5 corresponds to the count value reached by the counter 413. Note that the counter "counts up" (e.g., between times T2 and T3) when the one shot circuit output waveform 516 is a logic low (because the counter 413 is not held in a reset state). However, the counter value 518 is reset (e.g., at time T3 to a value of "0" when the one shot circuit output waveform 516 is a logic high. As a result, over time, the counter 413 count value 518 resembles a sawtooth waveform because the count value 518 is repeatedly reset (after being allowed to ramp up for only a limited amount of time).

The counter 413 count value 510 is fed to a comparator 414 that compares the count value 510 against a value of "X". Referring to FIGS. 3 and 4, if the count value 510 rises above a value of X, the comparator output 414 is configured to "deactivate" the non hysteresis comparator outputs 305, 306; and, as long as the count value 510 resides beneath a value of X, the comparator output 414 is configured to "activate" the non hysteresis comparator outputs 305, 306. Thus, as seen in the embodiments of FIGS. 3, 4 and 5, the non hysteresis comparator outputs 305, 306 are "activated" when the AC/DC detector 309, 409 output 310, 410, 510 is a logic low; and, the non hysteresis comparator outputs 305, 306 are "deactivated" when the AC/DC detector 309, 409 output 310, 410, 510 is a logic high.

According to the design theory of the AC/DC detector embodiment 409 of FIG. 4, during the presence of an AC signal at the hysteresis comparator output 415, the repeated resetting of the counter 413 (as described above) prevents the conter's count value 510 from reaching a value of "X". As such, the AC/DC detector output 410, 510 "activates" the non hysteresis comparator outputs 305, 306. During the presence of a DC signal at the hysteresis comparator output 415, the repeated resetting of the counter 413 stops; and, as a result, the count value 518 is able to reach and surpass a value of "X" (e.g., at time T6 in FIG. 5). In response, the comparator 414 "deactivates" the non hysteresis comparator outputs 305, 306. Note that after count 518 reaches the threshold to trigger enable signal 510, the appearance of a valid clock 503 anytime thereafter will reset the count 518 and enable signal 510 (e.g., as observed at time T1 of FIG. 5).

Thus, referring back to FIG. 3, if a signal appears on clock signal line 303, the data and clocks signals are forwarded for further processing by the non hysteresis comparators. If a signal does not appear on clock signal line 303, no signals are forwarded for further processing. The following discussion describes in more detail the operation of the one shot circuit 450 in FIG. 4.

Upon a first rising edge 520 of an AC signal from the hysteresis comparator output signal 515, a "1" is registered at the output 416 of the D flip flop 411 (as observed in the flip flop output waveform ("Q") 516 of FIG. 5). A second "1" is also registered upon a second rising edge 521. Note that the flip flop output Q 416 is coupled to the input of a delay unit 412 that provides a delayed version of the flip flop output signal waveform 516.

The output of the delay unit 412 is coupled to the reset input RST1 417 of the flip flop 411. As such, as seen in FIG. 5, the waveform at the flip flop reset input RST1 517 corresponds to the flip flop output Q 516 waveform being delayed by an amount of time ΔT. In the embodiment of FIGS. 4 and 5, the flip flop 411 is reset whenever the reset input RST1 517 is a logic high.

As such, a "1" is re-registered at the flip flop output Q 416 on the next rising edge of the hysteresis comparator output waveform 515 (e.g., at time T3 as observed in FIG. 5). Then the reset input RST1 517 falls to a logic low after an amount of time ΔT. The process then repeats. The value X used by comparator 414 as a threshold may then be tailored in light of the amount of time the counter 413 is allowed to count in between resets (and the frequency of clock CLKA for the counter 413).

It is important to point out that other AC/DC detector circuit embodiments, besides the particular AC/DC detector embodiment 409 shown in FIG. 4, may be implemented within the general approach observed in FIG. 3. Furthermore, as discussed, the output of other types of signal reception circuits (i.e., besides non hysteresis comparators 301, 302 such as input buffers, line termination units, etc.) may be "activated" or "deactivated" in accordance with the output of a parallel signal detection circuit 307.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a) a signal line to propagate a signal;
   b) a hysteresis comparator having an input coupled to said signal line;
   c) an AC/DC detector circuit having an input coupled to an output of said hysteresis comparator, said AC/DC detector circuit having an output to indicate whether an output signal of said hysteresis comparator is an AC signal or a DC signal; and,
   d) a signal reception unit having a first input coupled to said signal line, said signal reception unit having a second input coupled to said AC/DC detector circuit output to control whether said signal reception unit has an activated or inactivated output, said signal reception unit output activated if said hysteresis comparator output signal is an AC signal.

2. The apparatus of claim 1 wherein said signal line is to propagate a clock signal.

3. The apparatus of claim 2 further comprising a second signal line to propagate a data signal, said second signal line coupled to a first input of a second signal reception unit, said second signal reception unit having a second input coupled to said AC/DC detector output to control whether said second signal reception has an activated or inactivated output, said second signal reception unit output activated if said hysteresis comparator output signal is an AC signal.

4. The apparatus of claim 1 wherein said signal line is to propagate a data signal.

5. The apparatus of claim 1 wherein said signal line is a component within a source synchronous interface.

6. The apparatus of claim 5 wherein said source synchronous interface is an LVDS interface.

7. The apparatus of claim 5 wherein said source synchronous interface is an SGMII interface.

8. The apparatus of claim 1 wherein said AC/DC detector circuit further comprises a one shot circuit having an output to provide a pulse stream if a said AC signal exists at said hysteresis comparator output, said one shot circuit output coupled to a reset input of a counter, said counter having an output coupled to an input of a comparator, said comparator having an output to inactivate said signal reception unit if said counter reaches a first value.

9. The apparatus of claim 1 wherein said signal reception unit is a non hysteresis comparator.

10. A method, comprising:
    a) directing a signal through a hysteresis comparator;
    b) determining if an output signal of said hysteresis comparator, in response to said signal, is an AC signal or a DC signal; and
    c) inactivating an output of a signal reception unit that receives said signal if said hysteresis comparator output signal corresponds to a DC signal, or, activating said signal reception unit output if said hysteresis comparator output signal corresponds to an AC signal.

11. The method of claim 10 wherein said signal further comprises a clock signal.

12. The method of claim 11 further comprising inactivating an output of a second signal reception unit that receives a data signal if said hysteresis comparator output signal corresponds to a DC signal, or, activating said second signal reception unit output if said hysteresis comparator output signal corresponds to an AC signal.

13. The method of claim 10 wherein said signal is a data signal.

14. The method of claim 10 wherein said signal is a component of a source synchronous interface.

15. The apparatus of claim 5 wherein said source synchronous interface is an LVDS interface.

16. The apparatus of claim 5 wherein said source synchronous interface is an SGMII interface.

17. An apparatus, comprising:
    a) a transmitter to transmit a signal;
    b) a receiver that is coupled to said transistor to receive said signal, said receiver comprising:
       1. a signal line to propagate said signal;
       2. a hysteresis comparator having an input coupled to said signal line;
       3. an AC/DC detector circuit having an input coupled an output of said hysteresis comparator, said AC/DC detector having an output to indicate whether an output signal of said hysteresis comparator is an AC signal or a DC signal; and,
       4. a signal reception unit having a first input coupled to said signal line, said signal reception unit having a second input coupled to said AC/DC detector circuit output to control whether said signal reception unit has an activated or inactivated output, said signal reception unit output activated if said hysteresis comparator output signal is an AC signal.

18. The apparatus of claim 17 wherein said signal line is to propagate a clock signal.

19. The apparatus of claim 18 further comprising a second signal line to propagate a data signal, said second signal line coupled to a first input of a second signal reception unit, said second signal reception unit having a second input coupled to said AC/DC detector output to control whether an output of said second signal reception unit is activated or inactivated, said signal reception unit output activated if said hysteresis comparator output signal is an AC signal.

20. The apparatus of claim 17 wherein said signal line is to propagate a data signal.

21. The apparatus of claim 17 wherein said signal line is a component within a source synchronous interface.

22. The apparatus of claim 21 wherein said source synchronous interface is an LVDS interface.

23. The apparatus of claim 21 wherein said source synchronous interface is an SGMII interface.

24. The apparatus of claim 17 wherein said AC/DC detector circuit further comprises a one shot circuit having an output to provide a pulse stream if a said AC signal exists upon said hysteresis comparator output, said one shot circuit output coupled to a reset input of a counter, said counter having an output coupled to an input of a comparator, said comparator having an output to inactivates said signal reception unit output if said counter reaches a first value.

25. The apparatus of claim 17 wherein said signal reception unit is a non hysteresis comparator.

* * * * *